G. D. HOFFMAN.
AUTOMATIC AIR VALVE FOR STEAM RADIATORS.
APPLICATION FILED APR. 19, 1916.
1,252,267.
Patented Jan. 1, 1918.
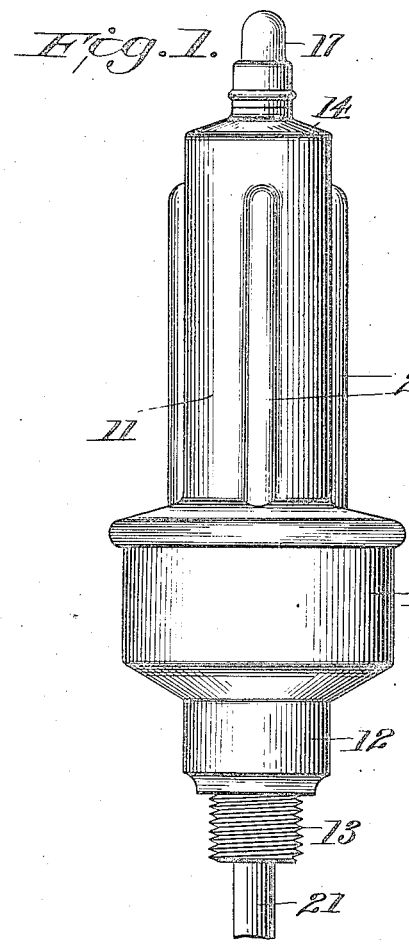
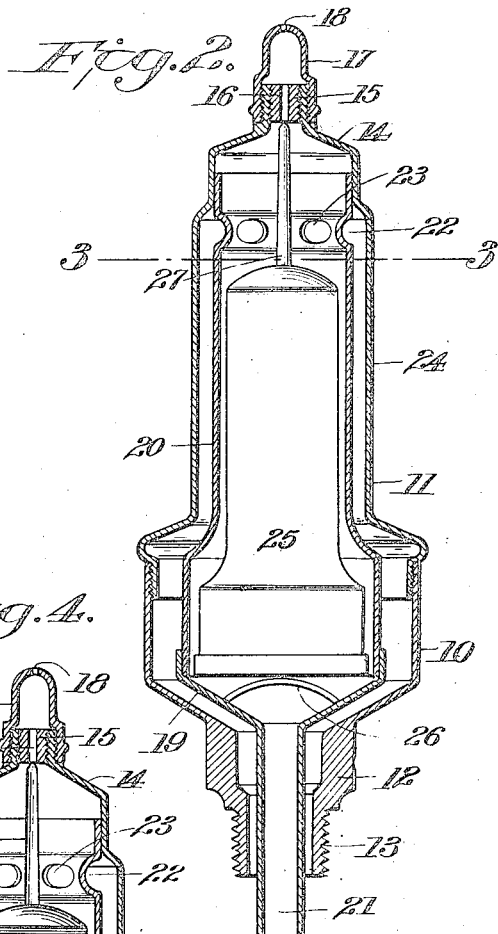
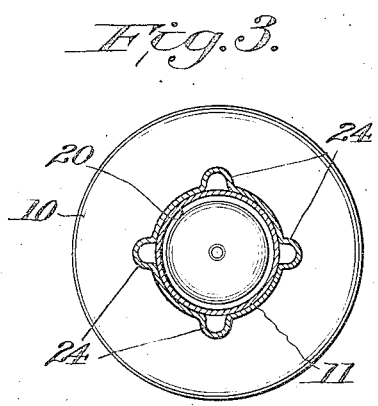
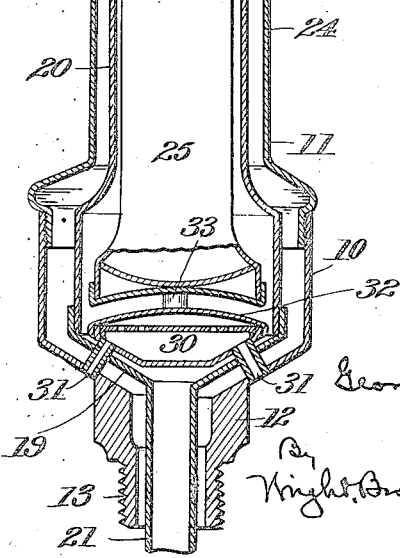
Inventor
George D. Hoffman
By
Wright, Brown, Quinby & May
Attorney

UNITED STATES PATENT OFFICE.

GEORGE D. HOFFMAN, OF PASADENA, CALIFORNIA, ASSIGNOR TO HOFFMAN SPECIALTY COMPANY, OF CHICAGO, ILLINOIS, A CORPORATION OF ILLINOIS.

AUTOMATIC AIR-VALVE FOR STEAM-RADIATORS.

1,252,267.

Specification of Letters Patent.   Patented Jan. 1, 1918.

Application filed April 19, 1916.   Serial No. 92,210.

*To all whom it may concern:*

Be it known that I, GEORGE D. HOFFMAN, of Pasadena, in the county of Los Angeles and State of California, have invented certain new and useful Improvements in Automatic Air-Valves for Steam-Radiators, of which the following is a specification.

This invention is an improved valve of the type employed to automatically vent steam heating systems of any air that may be trapped therein.

To secure successful operation of automatic air valves of the character mentioned, it is imperative that the valve must close automatically when the casing thereof becomes filled with water of condensation from the heating system; the casing must be completely drained of all water, without ejecting any portion of the water into the outside atmosphere; and when the water has been drained from the casing and all of the air has been ejected and is followed by steam, the valve must close automatically, so that escape of steam is prevented.

One of the objects of this invention is to provide an automatic air valve which will meet all requirements, the same having provision whereby air entering the valve casing from the heating system, is prevented from coming into conflict with the water at any time, the air being compelled to follow a predetermined course, which does not permit it to come into conflict with the water. A further object is to provide a device capable of meeting a demand for quick vent service at the ends of heating mains, which are so close to the water line that water may come up against the valve. A further object is to provide a valve capable of effecting quick venting of blast or "Vento" coils or stacks. A further object is to provide a valve designed for any quick vent service where water is liable to come against the valve, and where it is desired to check the passage of the water through the valve. A further object is to provide a valve of the type referred to having means for preventing the return of air to the radiator, stack, or line to which it is connected, when pressure ceases at the valve.

The invention will be hereinafter fully set forth and particularly pointed out in the claims.

In the accompanying drawing,

Figure 1 is a side elevation of a valve constructed in accordance with the invention. Fig. 2 is a longitudinal sectional view thereof. Fig. 3 is a transverse sectional view on the line 3—3 Fig. 2. Fig. 4 is a longitudinal sectional view of a modified form of the invention.

Referring to the drawing, the casing of the valve comprises a cup-like base 10, provided with internal screw threads to engage the externally threaded lower end of the upper casing member 11. The bottom of the cup-like member 10 is preferably cone shaped, and thickened at 12 to provide a nipple having a reduced threaded portion 13, adapted to engage a tapped opening in the heating system. The upper end of the casing member 11 is reduced, as indicated at 14, and supports a plug 15 having a bore therethrough, forming a vent 16, the inner end of which also serves as a valve seat. A removable cap 17 is attached to the reduced portion 14 and provided with a vent opening 18.

Located within the valve casing, is a shell provided with a bottom 19, and a tubular upper portion 20, secured together in suitable manner. The bottom 19 is of conical form, conforming to the base 10 of the casing, and is provided with a drainage tube 21, leading from the center thereof through the nipple 12. The tubular portion 20 is pressed inwardly near its upper end, as indicated at 22, to form an annular groove, the periphery of the upper end of said tubular portion, above said groove, being in contact with the interior face of said casing member 11. The valve casing and the shell therein are so related, that an air space is formed between them, leading in from the heating system, around the bottom 19, and the tubular portion 20, to the groove 22, the wall of said groove being provided with perforations 23, permitting air to enter to the interior of said tubular portion 20. This air space may be provided in any suitable manner. In forming the upper casing member 11, it is preferred to emboss or offset portions thereof, as indicated at 24, to form air channels leading from the bottom of the valve casing to the groove 22, thereby permitting contact between the periphery of the tubular member 20, and the wall of the upper casing member, between said bosses;

so that the shell may be properly centered in the valve casing.

Located within the water chamber formed by the tubular portion 20 and its bottom member 19, is a float 25, formed of a sealed chamber, resting upon a support 26, attached to the bottom member 19, the upper end of said float being provided with a valve member 27 arranged to close the outlet port 16. The sealed chamber of the float possesses sufficient buoyancy to permit the same to rise within the water chamber when its buoyant line is reached, to bring the valve member 27 against the inner end of the outlet port 16. The float is provided with a flexible bottom adapted to be bulged or deflected outwardly by the expansion of any suitable thermal liquid inclosed within the chamber. The deflection of said bottom takes place when steam reaches the casing, causing expansion of the thermal liquid, and effecting the elevation of the valve member 27 to close the port 16.

In practice, when the valve is first attached to the heating system, the parts assume the positions illustrated in Fig. 2. During the operation of the heating system, it is well known that under certain conditions of the service, water of condensation surges up and down therein, and as the water goes up it will be discharged into the atmosphere unless checked. As long as the water level remains below the lower end of the drainage tube 21, the float will rest upon the support 26, and any air within the system, may pass through the nipple 12, air channels 24, perforations 23, and finally out through the vent port 16. As soon as sufficient water accumulates in the water chamber to lift the float 25, the valve 27 is positioned to close the port 16, so that as the water continues to rise, it cannot be ejected through the vent. As the water rises, a certain quantity thereof will of course pass upwardly through the air channels 24. Just as soon as the water in the heating system begins to drop, water within the water chamber is drawn downwardly through the tube 21, and any water that may be in the air channels 24 is forced upwardly through said channels, by reason of the reduction of pressure in the water accumulating chamber, and discharged into the top of said water accumulating chamber, and because the water is so discharged into the said water accumulating chamber, any air back of the water will pass out of the vent 16, just as soon as the float drops, without carrying any of the water with it. The vent 16 is of such size that a certain amount of back pressure is created in the casing of the valve when air is escaping through said vent and the weight of the float is such that, assisted by the back pressure, the float will drop just as soon as the water falls below the buoyant line thereof, and the separate air channel through the nipple 12 and conduits 24, serves to keep the pressures in balance, so as to insure the prompt operation of the valve under all conditions. It will be understood that the pressures at 21 and 12, are controlled by the pressure in the radiator system, and that the pressures at these points will not be materially different at any time and as long as the vent 16 is open, water may enter the tube 21, and air simultaneously enter space 22, both traveling at approximately the same speed.

It will be noted that the tube 21 is so connected with the water chamber as to prevent passage of water from the chamber except through said tube. The upper end of the tubular member 20 is extended well above the upper end of the float 25, so that any particles of water carried upwardly through the channels 24 and delivered within the tubular member 20 through the perforations 23, will fall into the water chamber out of the influence of the upwardly moving air. As soon as the water and air have been drawn out of the radiator, and steam enters the valve casing, the thermostatic float 25 expands and closes the port 16 so that escape of steam is prevented.

The advantages of the invention will be readily understood by those skilled in the art. For instance, as is well known, it frequently happens that a radiator while venting, "works water" and under this condition the water is liable to surge against the air valve. The float herein described is so constructed that it necessarily closes and closes tight against water leaking, and the valve remains closed as long as water is against it. The instant the water drops away from the valve, the drainage tube automatically discharges the water in the valve, back into the radiator, and the valve recommences venting. It is a well known law in physics that a fluid cannot be discharged from a sealed vessel without being displaced by another body, and this principle forms the basis of the operation of this invention. When the drainage tube discharges water from the valve hereindescribed, the air passes into the casing through distinct separate passages, provided for it by means of the space between the inner and outer shells. From an inspection of the drawing, it will be readily understood that air entering the valve through the nipple 12 cannot pass through the water in the float chamber, but must pass upwardly outside of the float chamber, between the inner and outer casings. The outlets for the air conduit, being above the highest possible level of the water in the water chamber when the valve 27 is unseated, the air passes out of the valve perfectly dry and without the slightest spit, because it can never come into conflict with the water. No matter how many times the water surges against and into the valve casing, the sealed metal float rides the water like a cork and closes the valve before the slightest drop can get by. It closes and opens as the water comes and goes, without the slightest leak, and by reason of the thermostatic construction of the float, it also promptly and efficiently distinguishes between steam and air, venting all of the air, without permitting the passage of steam.

In Fig. 4 is shown a modification which is designed to prevent the return of air to the radiator, stack, or line to which the valve is connected, when pressure ceases at the valve. In this form of the invention a diaphragm chamber 30 is located within the bottom 19 of the inner casing, said diaphragm chamber being provided with ports 31 leading from the interior thereof to the outside atmosphere, said ports being preferably in the form of short tubes extending through the bottom 19 and the base 10, and serving to support the chamber 30 in position. The top wall of the chamber 30 is formed as a flexible diaphragm 32 provided with the central stud 33 which sustains the float. The diaphragm 32 is so shaped that the float 25 is normally elevated so that the valve 27 closes the port 16. The upward tension of the diaphragm 32 is preferably so adjusted that it requires, at the most, not over four ounces to deflect it, although this may be varied as desired. In practice, the diaphragm 32 holds the valve 27 normally seated to close the port 16, but just as soon as the internal pressure within the valve casing is sufficient to deflect the diaphragm, the float will move downwardly with the diaphragm and unseat the valve 27. This action is due entirely to the internal pressure, and as soon as the internal pressure is reduced, the diaphragm will return the valve to its closed position. By reason of this arrangement the valve when cold, is normally closed, but opens as soon as the required pressure reaches it. It closes instantly if water comes against it, preventing any water leakage through the valve; it opens instantly when water, which has closed it drops away from it, without water spit. It closes the instant steam reaches it. When pressure goes off, the valves instantly and automatically closes against the ingress of air through the valve into the pipe line or stack to which it is connected. From this it will be seen that the valve is absolutely automatic in all of it functions, letting all of the air out without steam or water leakage, and once out keeping it out.

Having thus explained the nature of my invention and described an operative manner of constructing and using the same, although without attempting to set forth all of the forms in which it may be made, or all of the forms of its use, what I claim is:—

1. An air valve for steam radiators comprising a casing having an air outlet in its upper portion and a nipple leading downwardly from the bottom thereof, a water chamber within said casing, a float within said water chamber provided with a valve for closing said air outlet, a drainage tube leading downwardly from the bottom wall of said water chamber through said nipple, and connected with said chamber to prevent passage of water from the chamber except through said tube, and an air conduit having its inlet end communicating with the nipple, and having its air discharge outlet in communication with the water chamber at a point above any possible level of the water within said chamber when the valve carried by the float is unseated.

2. An air valve for steam radiators comprising a casing having an air outlet in its upper portion, and a downwardly extended nipple leading from the bottom thereof, a water accumulating chamber within said casing, a float within said water accumulating chamber and provided with a valve for closing said air outlet, and a drainage tube leading downwardly from the bottom wall of said water chamber through said nipple, and connected with said chamber to prevent passage of water from the water accumulating chamber, except through said tube, the wall of said water chamber and the wall of the casing coöperating to form an air conduit, having its inlet end communicating with the nipple and having its air discharge outlet in communication with said water chamber at a point above any possible level of the water in said water chamber when the valve carried by said float is unseated.

3. An air valve for steam radiators comprising a casing having an air outlet in its upper end and having a conical bottom provided with a centrally disposed nipple, a water accumulating chamber within said casing also having a conical bottom, a siphonic drainage tube leading from the bottom of said water chamber at the center thereof, and extending through said nipple, said tube being connected with said chamber to prevent passage of water from the chamber except through said tube, a float within said water chamber provided with a valve for closing said air outlet, and an air conduit having its inlet end communicating with the nipple, and having its air discharge outlet in communication with said water accumulating chamber at a point above any possible level of the water within the water accumulating chamber when the valve carried by said float is unseated.

4. An air valve for steam radiators comprising a casing having a vent opening and a water chamber, a float in the water chamber, having a valve controlling said vent, a water discharge conduit leading from said water chamber, an air conduit for directing air to said vent opening, a pressure member upon which said float normally rests, said pressure member acting to hold the valve seated when the internal pressure within the casing falls below a predetermined minimum, and air inlet tubes supporting said pressure member.

5. An air valve for steam radiators comprising a casing having a vent opening and a water chamber, a float in the water chamber having a valve controlling said vent opening, a water discharge conduit leading from the bottom of said water chamber, a separate air conduit communicating with the top of said water chamber, a pressure member within said water chamber and acting to hold said valve seated when the internal pressure within said casing falls below a predetermined minimum, and air inlet tubes supporting said pressure member.

6. An air valve for steam radiators comprising a casing having a vent opening and a water chamber, a float in the water chamber having a valve controlling said vent opening, a water discharge conduit communicating with said water chamber, an air conduit for directing air to said vent opening, a diaphragm chamber normally supporting said float, and air conduits extending through the walls of said casing, said water chamber and said diaphragm chamber and placing the diaphragm chamber in communication with the outside atmosphere.

7. An air valve for steam radiators comprising a casing having an air outlet in its upper portion, and a threaded nipple connected with the lower portion thereof, a water chamber within said casing, a float within said water chamber and provided with a valve for closing said air outlet, a drainage tube leading from the lower portion of said water chamber, and connected therewith to prevent passage of water from the chamber except through said tube, an air conduit having its inlet end communicating with the nipple and having its sole outlet in communication with the water chamber at a point above any possible level of the water within the water accumulating chamber when the valve carried by said float is unseated, a pressure member acting to hold said valve seated when the internal pressure within said casing falls below a predetermined minimum, and air inlet tubes supporting said pressure member.

8. An air valve for steam radiators comprising a casing having an air outlet in its upper end and having a conical bottom provided with a centrally disposed nipple, a water accumulating chamber within said casing also having a conical bottom, a siphonic drainage tube leading from the bottom of said water chamber at the center thereof, and connected therewith to prevent passage of water from the chamber except through said tube, a float within said water chamber provided with a valve for closing said air outlet, and an air conduit having its inlet end communicating with the nipple, and having its air discharge outlet in the upper portion of said water accumulating chamber, a diaphragm chamber within said water accumulating chamber, and air vent pipes extending through the bottom walls of said casing and said water accumulating chamber and communicating with said diaphragm chamber, said float normally resting upon said diaphragm chamber.

In testimony whereof I have affixed my signature, in presence of two witnesses.

GEORGE D. HOFFMAN.

Witnesses:
JOHN H. McALOON,
FRANK CORCORAN.